US007426697B2

(12) United States Patent
Holecek et al.

(10) Patent No.: US 7,426,697 B2
(45) Date of Patent: Sep. 16, 2008

(54) MULTI-APPLICATION TABBING SYSTEM

(75) Inventors: Ales Holecek, Bellevue, WA (US);
Charles W. Stabb, Seattle, WA (US);
Hillel N. Cooperman, Sammamish, WA (US); Jeffrey W. Pettiross, Seattle, WA (US); Mark R. Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 11/036,614

(22) Filed: Jan. 18, 2005

(65) Prior Publication Data

US 2006/0161859 A1 Jul. 20, 2006

(51) Int. Cl.
*G06F 3/00* (2006.01)

(52) U.S. Cl. ............... 715/788; 715/794; 715/807; 715/733; 715/753; 715/767; 715/779; 715/793

(58) Field of Classification Search ............ 715/759, 715/779, 781, 517, 850
See application file for complete search history.

(56) References Cited

U.S. PATENT DOCUMENTS

| | | | | | |
|---|---|---|---|---|---|
| 4,862,389 | A | * | 8/1989 | Takagi | 715/794 |
| 5,546,528 | A | * | 8/1996 | Johnston | 715/807 |
| 5,758,110 | A | * | 5/1998 | Boss et al. | 715/751 |
| 5,874,960 | A | * | 2/1999 | Mairs et al. | 715/733 |
| 5,892,511 | A | * | 4/1999 | Gelsinger et al. | 715/764 |
| 5,920,316 | A | * | 7/1999 | Oran et al. | 715/779 |
| 6,040,833 | A | * | 3/2000 | Henshaw | 715/794 |
| 6,072,488 | A | * | 6/2000 | McFarland | 715/799 |
| 6,184,883 | B1 | * | 2/2001 | Bates et al. | 715/794 |
| 6,239,798 | B1 | * | 5/2001 | Ludolph et al. | 715/788 |
| 6,957,395 | B1 | * | 10/2005 | Jobs et al. | 715/765 |
| 2001/0035882 | A1 | * | 11/2001 | Stoakley et al. | 345/779 |
| 2002/0130904 | A1 | * | 9/2002 | Becker et al. | 345/753 |
| 2003/0210270 | A1 | * | 11/2003 | Clow et al. | 345/767 |
| 2004/0261039 | A1 | * | 12/2004 | Pagan | 715/797 |
| 2006/0041846 | A1 | * | 2/2006 | Masselle et al. | 715/793 |

OTHER PUBLICATIONS

TDB-ACC-No. NA9306219—Disclosure Title: Left-Shift and Right-Shift Buttons for a Standard Window ☐☐.*
"Opera Software," printed from Internet on Nov. 4, 2004, http://www.opera.com/features/index.dml, 8 pages.

(Continued)

*Primary Examiner*—Sy D. Luu
*Assistant Examiner*—Linh K Pham
(74) *Attorney, Agent, or Firm*—Shook, Hardy & Bacon L.L.P.

(57) ABSTRACT

A method for displaying a plurality of windows on a display screen is described. The method includes steps of associating a first window with at least one second window, the at least one second window being independent of and external to the first window, and combining the first window and the at least one second window into a common window on a display screen, the first window and the at least one second window being configured to share a common window frame. An indicator may appear on the display as a target region when a user desires to associate the first and the second windows. Subsequent operations performed on the common window are performed automatically on any underlying window. For example, when a user chooses to save the contents of the common window, the contents of all of the windows of the common window may be saved.

20 Claims, 14 Drawing Sheets

OTHER PUBLICATIONS

"Mozilla," printed from Internet on Nov. 4, 2004, http://www.mozilla.org/products/firefox/tabbed-browsing.html, 3 pages.

"Safari, The fastest browser on the Mac—the best browser on any platform.", printed from Internet on Nov. 4, 2004, http://www.apple.com/safari/ , 3 pages.

Shneiderman, Ben, "Treemaps for space-constrained visualization of hierarchies," Dec. 26, 1998, (updated May 18, 2004), 10 pages, printed from Internet on Nov. 2, 2004, http://www.cs.umd.edu/hcil/treemap-history/.

* cited by examiner

MULTI-APPLICATION TABBING SYSTEM

FIELD OF THE INVENTION

Aspects of the present invention are directed generally to window arrangements in an operating system. More particularly, aspects of the present invention are directed to a method and system for tabbing multiple windows in an operating system and allowing some intelligent behavior to exist between the windows.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper. By interfacing with the windows, a user can access any window as if grabbing a single sheet of paper. A windows based configuration allows a user to have two or more windows open on a screen simultaneously.

One common configuration is to show multiple parts of a single document, like sheets in Microsoft® Excel by Microsoft® Corporation of Redmond, Wash., or multiple documents in a single window, like source code and reference material in Microsoft® Visual Studio by Microsoft® Corporation of Redmond, Wash. Most recently, it has appeared in web browsers, including Opera software by Opera Software ASA of Oslo, Norway, Mozilla Firefox software by the Mozilla Organization of Mountain View, Calif., and Apple Safari by Apple Computer, Inc. of Cupertino, Calif., as a feature called tabbed browsing. All of these implementations introduce the ability for the user to access the set of tabs and quickly reopen a set of tabs at the same time. In these systems, the tabs are inside the top-level window frame, and the contents of each tab are similar, dialog box controls or web pages, for example.

Presently, independent and external windows cannot be grouped together, so heterogeneous windows cannot be managed together. A similar invention has been used before, as in tabbed dialog box windows or tabbed web browser pages. Operating systems do not currently allow for multiple windows to be associated with each other so that an operation performed on one window cannot be performed automatically on a second independent and external window.

SUMMARY OF THE INVENTION

There exists a need for the ability to group any two or more top-level windows together, so heterogeneous windows can be managed together. There is a need for a method for combining a plurality of windows on a display screen where a user can tab between the different windows associated in the combined window. The method may includes steps of associating a first window with at least one second window, the at least one second window being independent of and external to the first window, and combining the first window and the at least one second window into a common window on a display screen, the first window and the at least one second window being configured to share a common window frame.

Another aspect of the invention provides an indicator that may appear on the display as a target region when a user desires to combine the first and the second windows into a common window. Subsequent operations performed on the common window are performed automatically on the content of the first and second windows.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
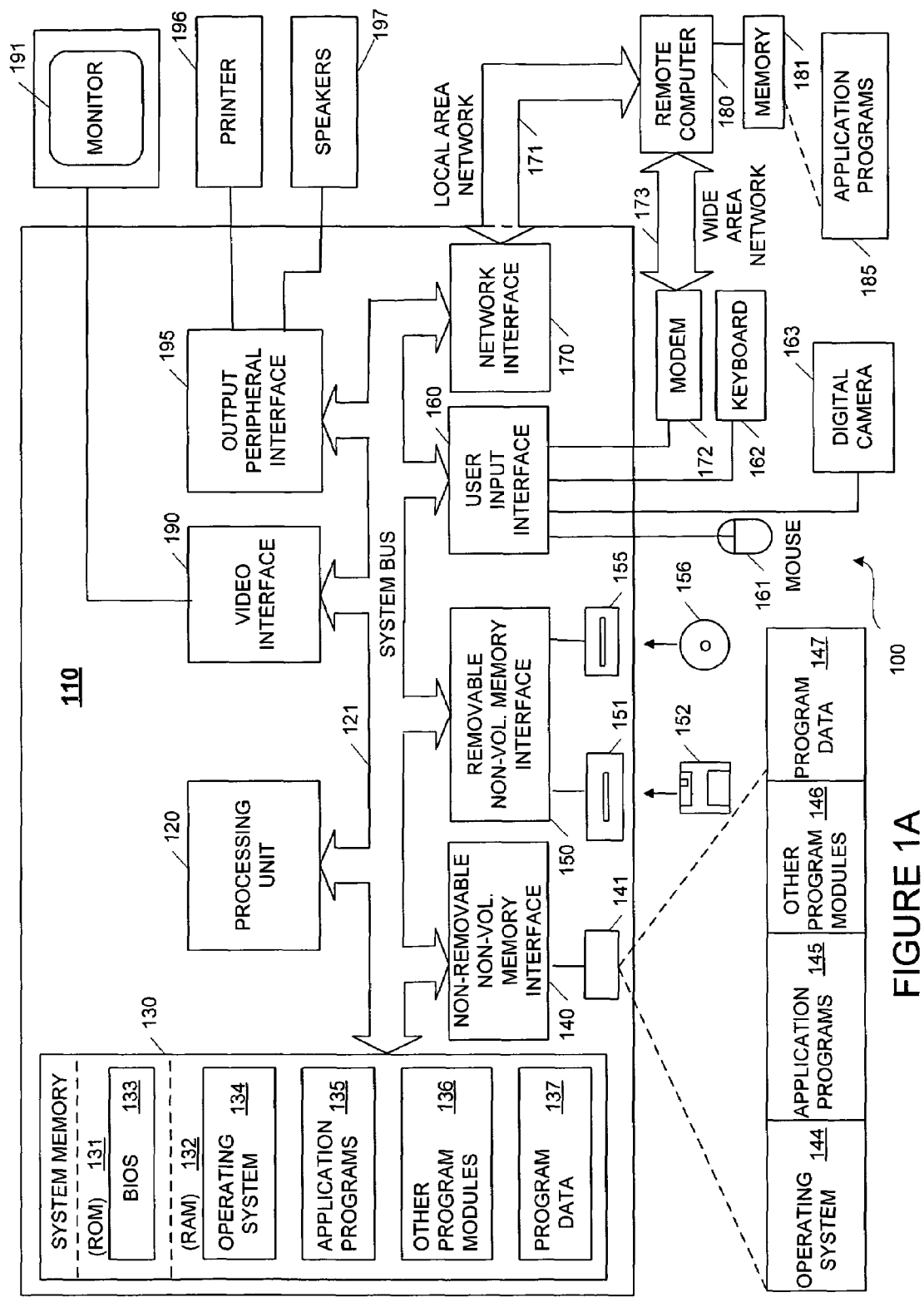
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
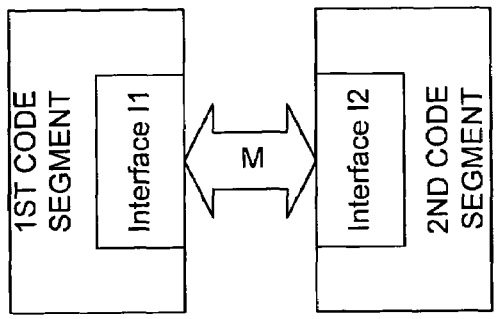
FIGS. 1B through 1M show a general-purpose computer environment supporting one or more aspects of the present invention.
Figure 1E:
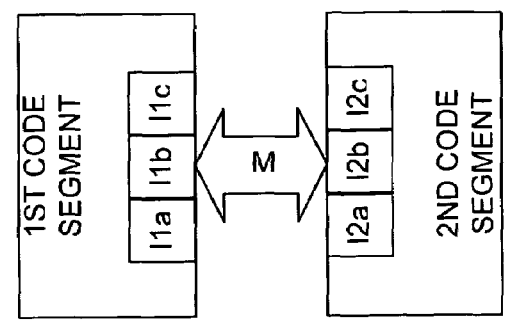
Figure 1B:
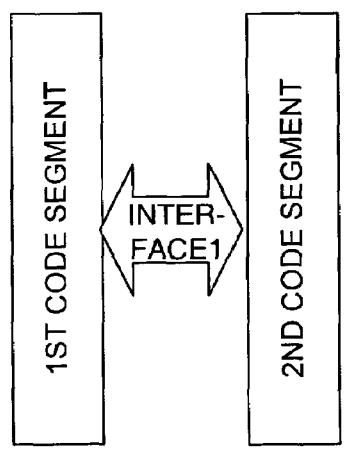

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
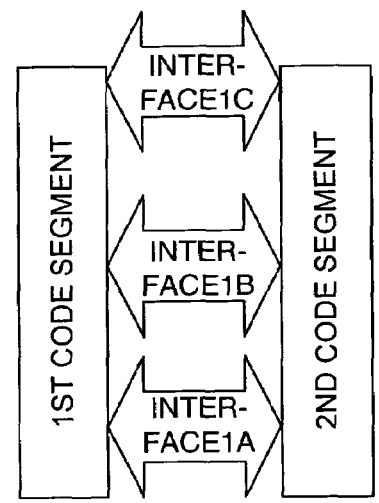

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
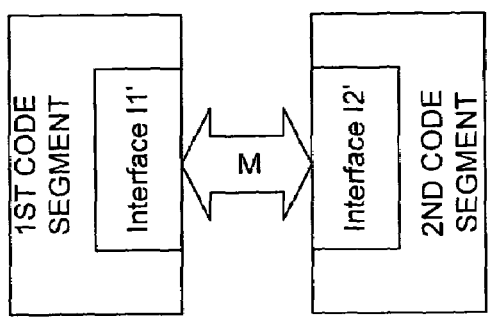
Figure 1G:
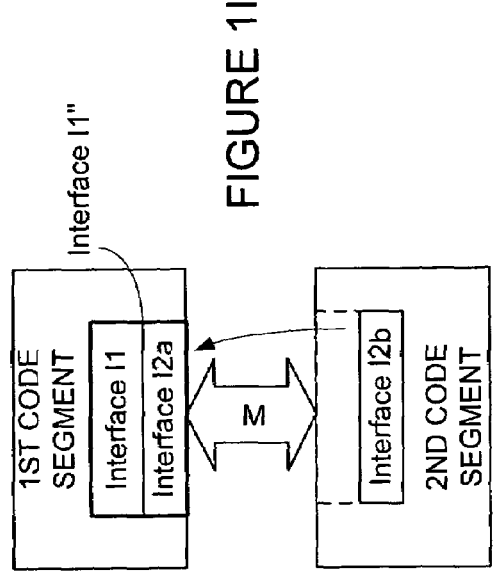

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
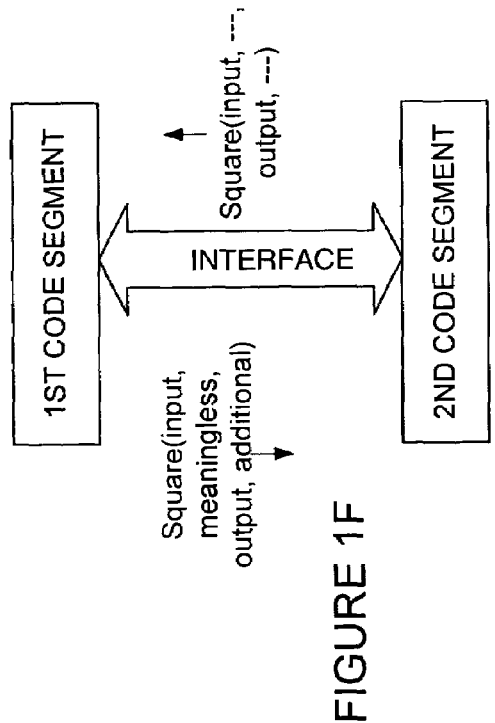
Figure 1I:
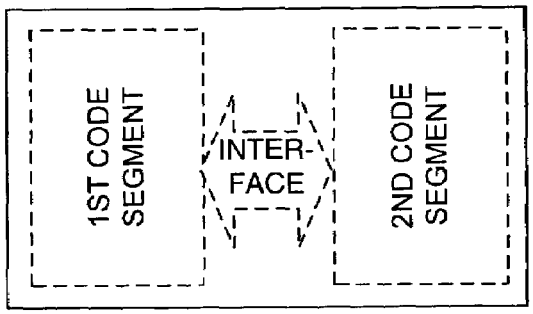

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
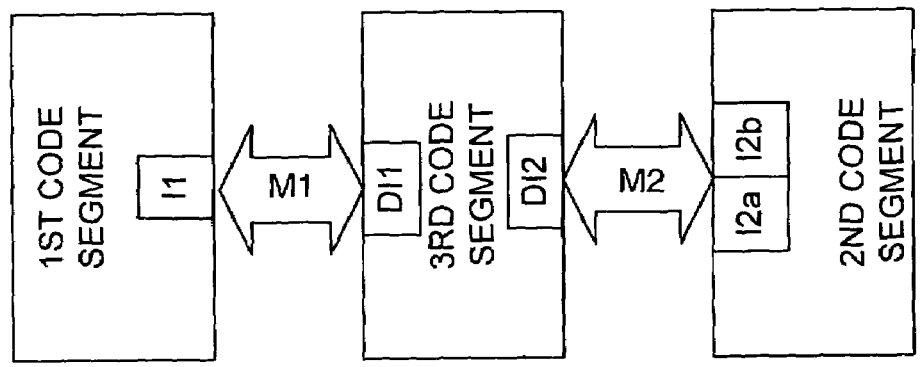
Figure 1J:
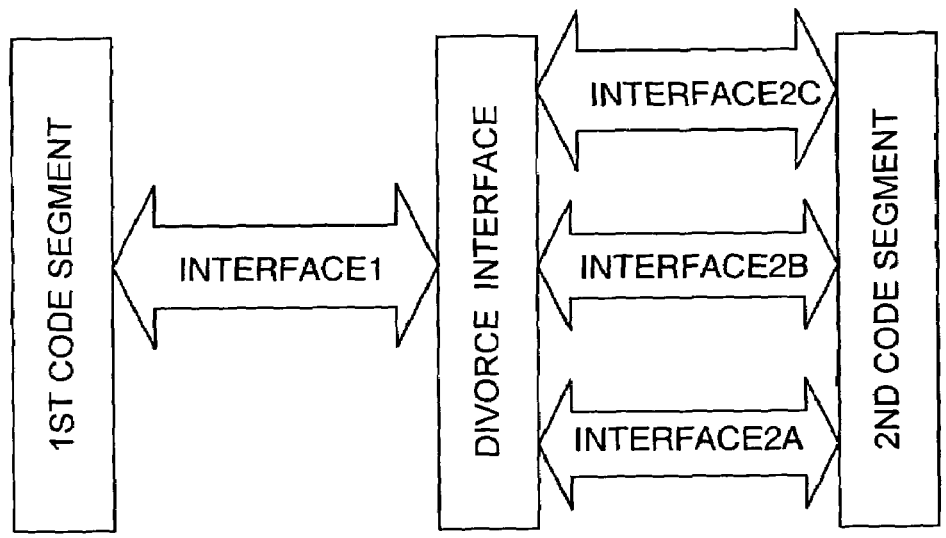

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
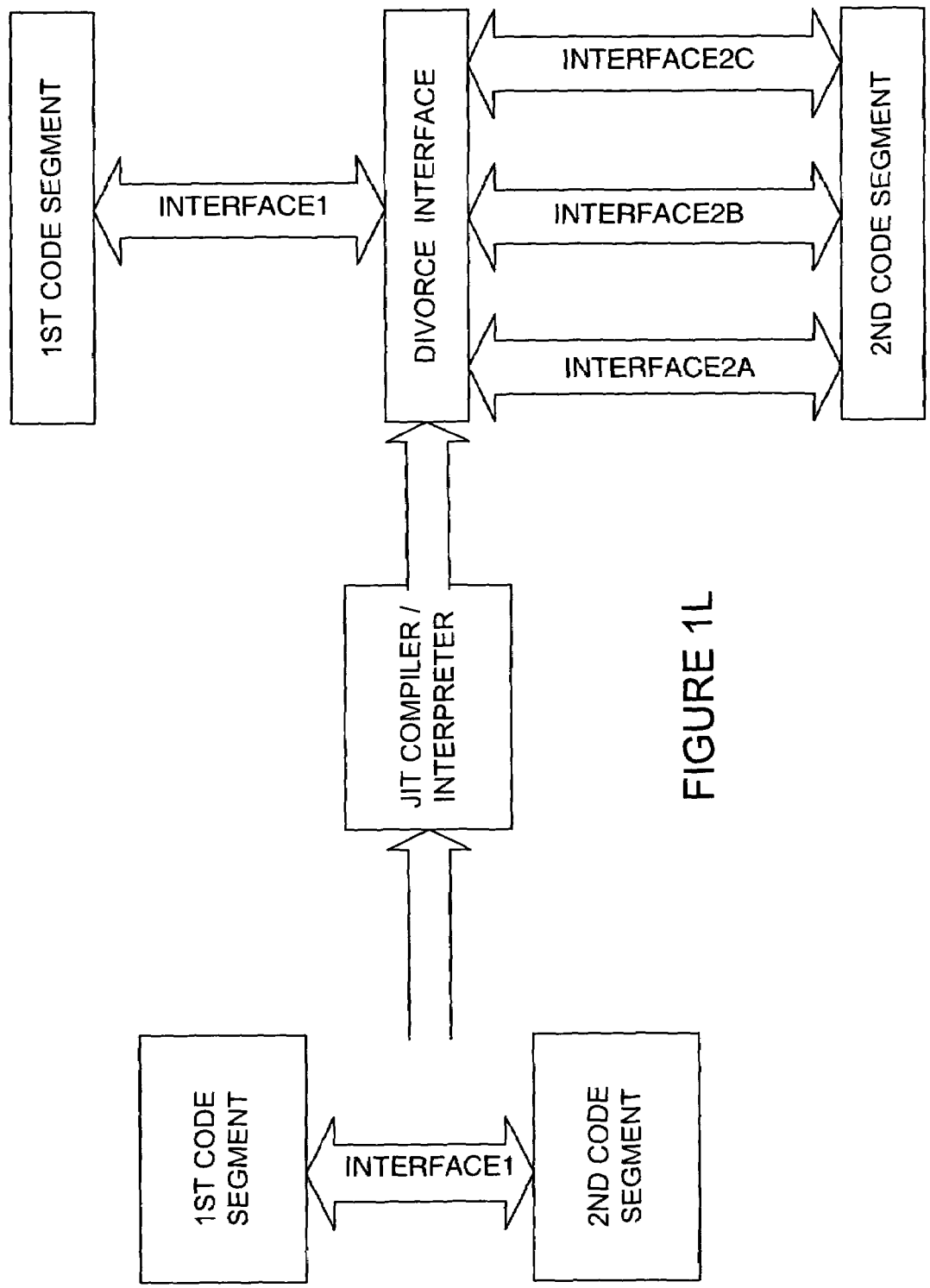
Figure 1M:
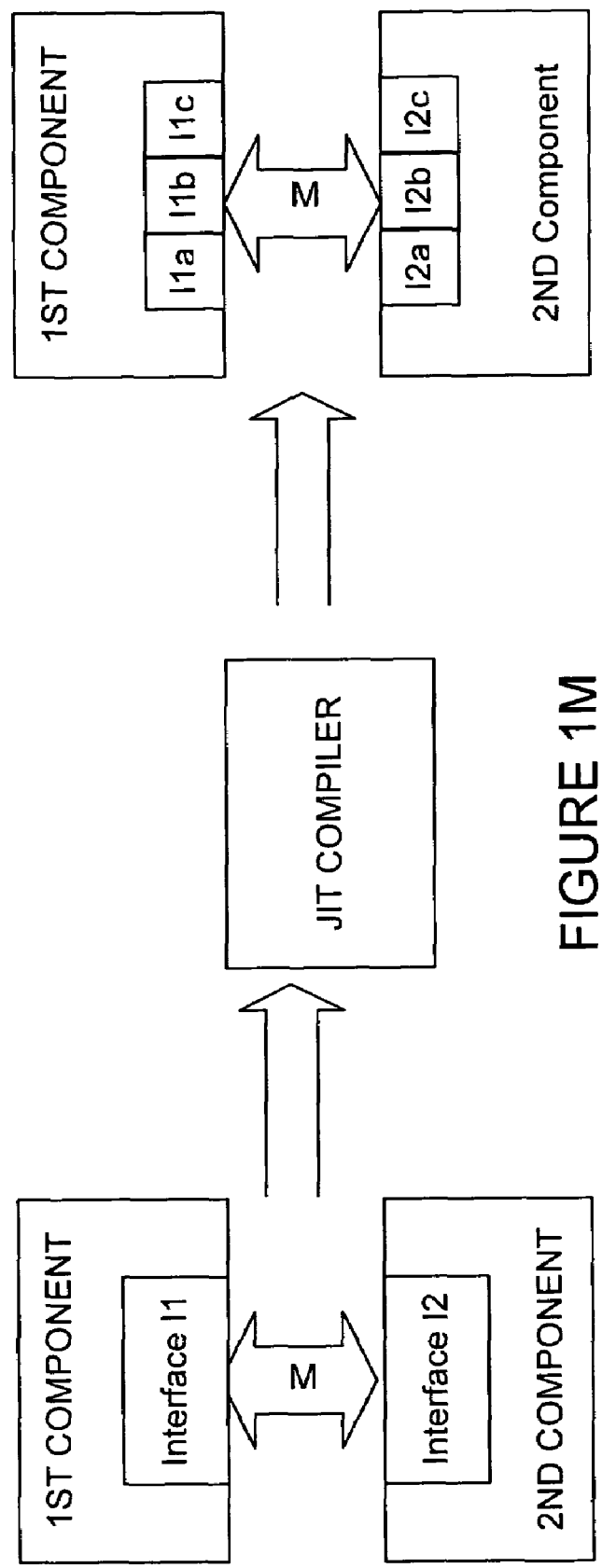

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
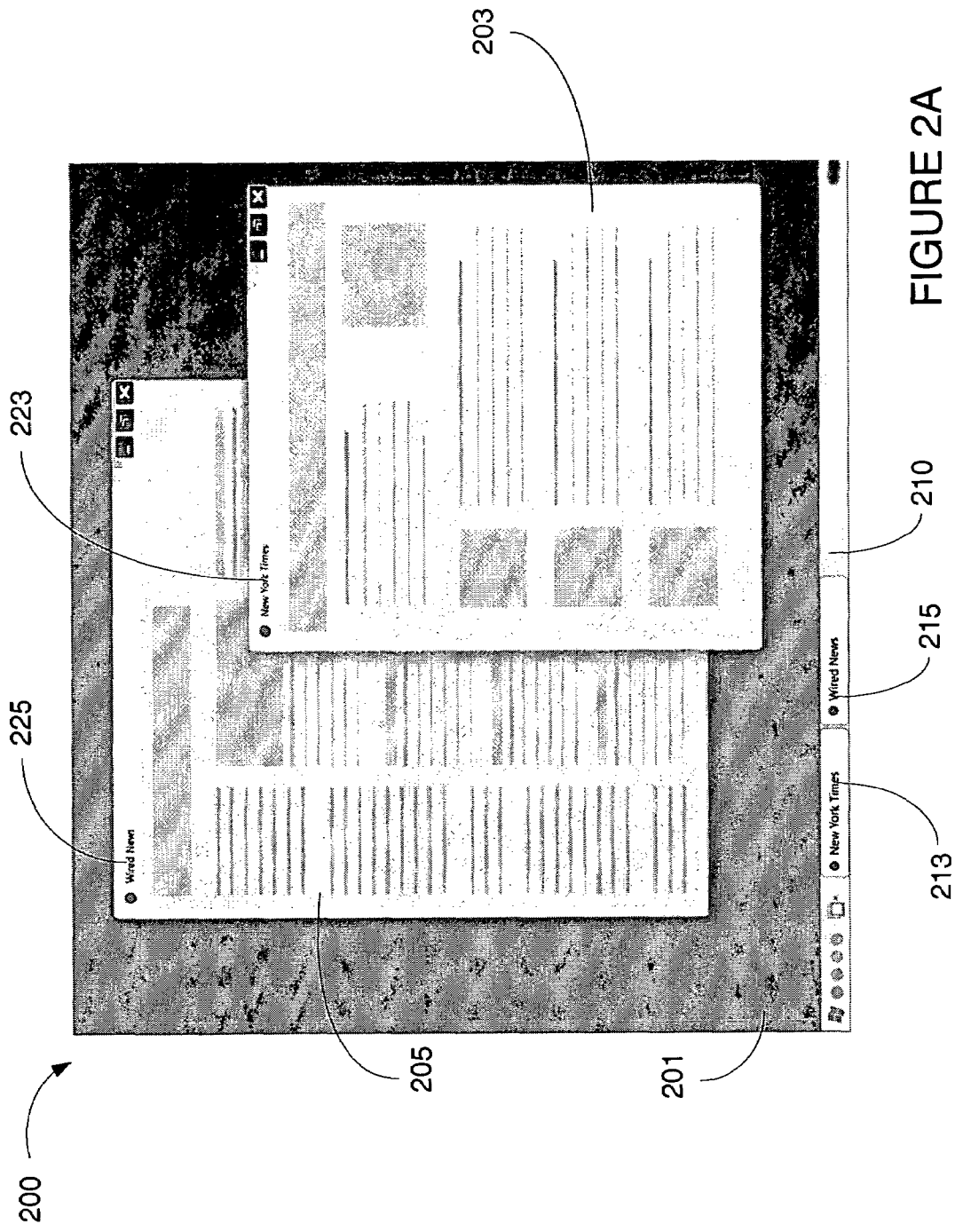
FIGS. 2A-2B illustrate a sequence of mouse pointer and window movements for combining two windows in accordance with at least one aspect of the present invention.
Figure 2B:
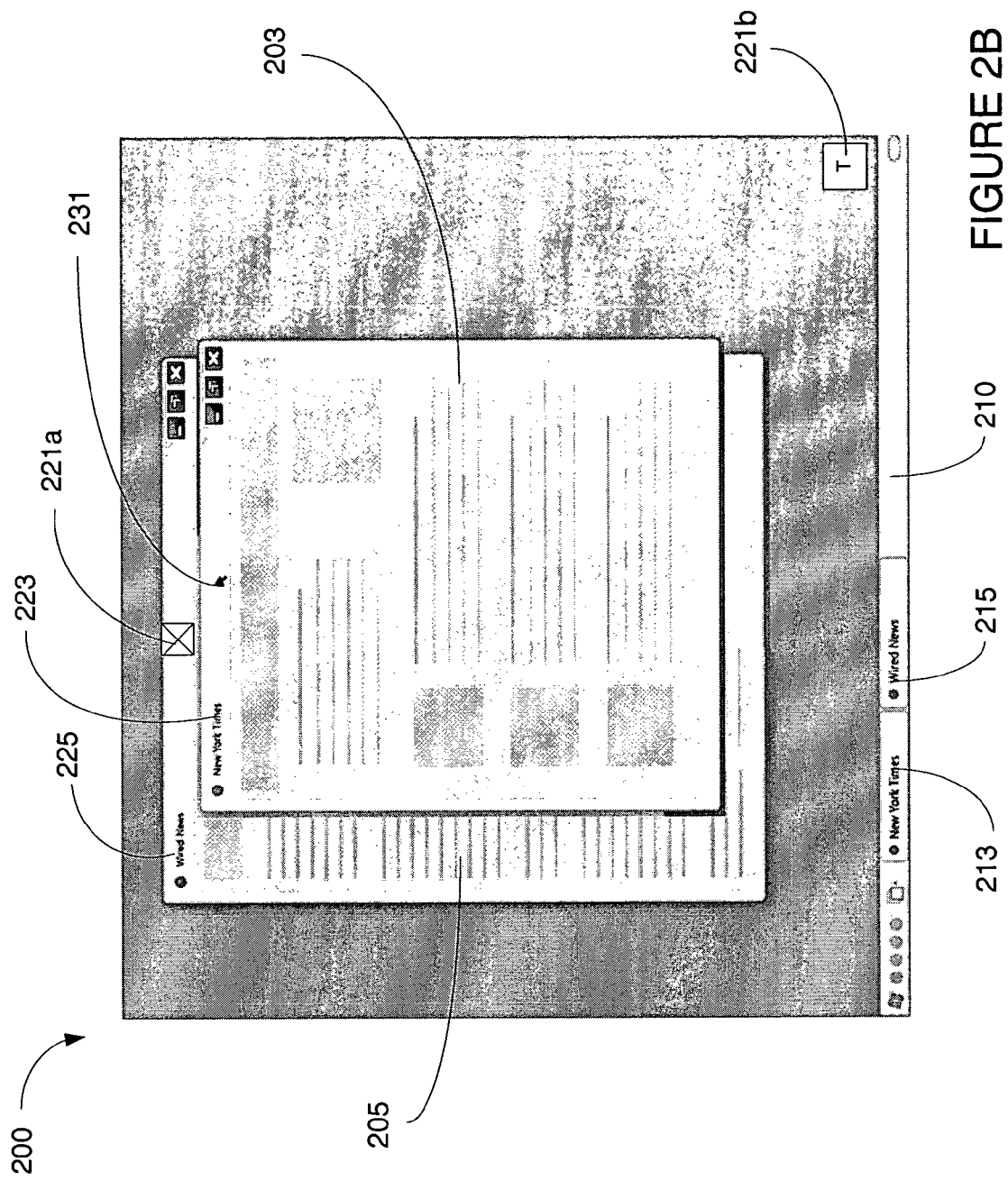

FIGS. 2A-2B illustrate a sequence of mouse pointer and window movements for associating and combining two windows in accordance with at least one aspect of the present invention. As used herein, the term "associating" is defined herein to mean creating a relationship between two independent objects. FIG. 2A shows an initial example system 200 orientation of two windows 203 and 205 in a Z-order. It should be understood by those skilled in the art that the Z-order of an orientation of windows is very well known in the art. Window 203 is shown higher in the Z-order compared to window 205. As used herein, the term "orientation" is defined herein to include adjustments to the visual appearance of a window or group of windows, such as the size or shape of the window and a shared common border between or around at least two windows.

Windows 203 and 205 are oriented within a desktop space 201. Desktop space 201 is an area of a display that allows for the display of windows corresponding to application programs. The taskbar at the bottom indicates which windows are currently in use, which may be visible or minimized. A taskbar is a specific implementation of an on-screen window remote control used to list and enable manipulation of windows, such as activating, moving, hiding, and minimizing. Window 203 is represented by taskbar button 213 and window 205 is represented by taskbar button 215. As shown in this example, the two windows 203 and 205 are shown open. Although only two windows are shown, it should be understood that more windows may be open. The file name of the content of windows 203 and 205 are shown along the title bar area of the respective window. The title of window 203 is shown as "New York Times" and the title of window 205 is shown as "Wired News". These titles may be generated by the application program operating the window and/or may be customizable by a user. The same title for each window 203 and 205 is shown in the corresponding taskbar button 213 and 215.

Windows 203 and 205 are used by application programs to display content to a user. The application program associated with window 203 may be a different application program or the same application program corresponding to window 205. Window 203 is independent of and external to window 205. As used herein, a first window is external to a second window when the first window is not contained within the second window and the second window is not contained within the first window. It should be understood that a first window is not contained in a second window if the two windows merely overlap.

As shown in FIG. 2B, a user has begun to move the topmost window, window 203, by dragging its title bar with a mouse pointer 231. In this example, a target region 221 a has appeared over a predefined area of a region of the destination window. As shown by the example in FIG. 2B, the target region 221a appears within the title bar of window 205. Target region 221a may appear when the mouse pointer and/or a portion of another window is/are within the predefined area. For example, as shown in FIG. 2A, target region 221a does not exist; however, when the mouse pointer 231 is within a predefined distance of the target region 212a, the target region 221a appears on the display. Alternatively, target region 221b may be a predefined location point on the display where two windows can be dragged and dropped to be combined with each other. The target region 221b may always be displayed in a predefined location, relative to the destination window or to the display screen, or it may appear when a window and/or mouse pointer is/are close to the target region.

Figure 3:
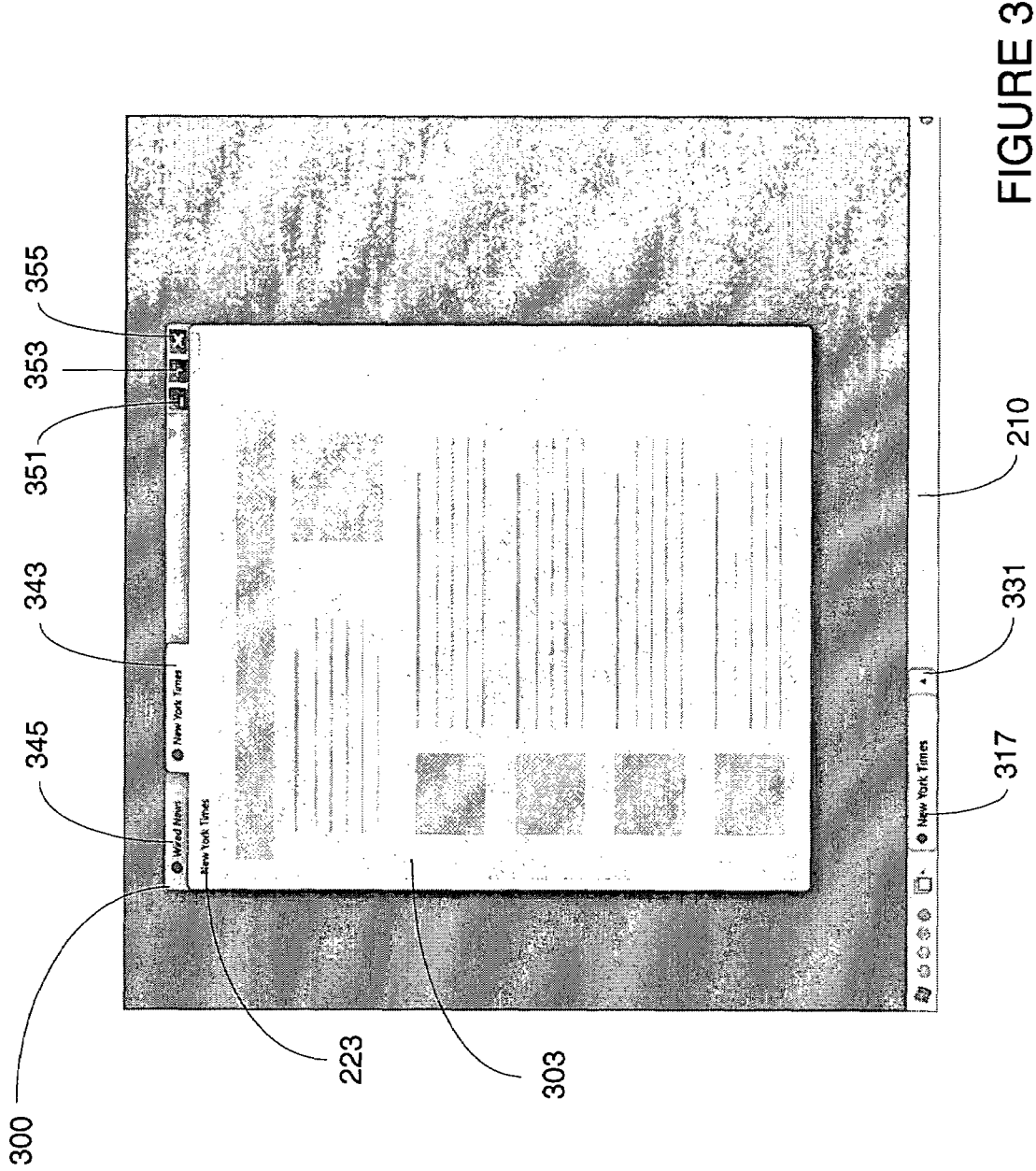
FIG. 3 illustrates an example of a combined window being displayed in accordance with at least one aspect of the present invention.

As shown in the example of FIG. 3, a user has dragged window 203 over the target region 221a. Upon release/drop of window 203 over the target region 221a, windows 203 and 205 are combined with each other into a common or tabbed window 300. Tabbed windows are a set of windows that can be managed, e.g., moved, resized, etc., together. Only one window in the set is visible at a time while the others can be selected by clicking on a tab extending from an edge of a common window frame. Tabbing windows together reduces the amount of window management a user must perform as well as reduces the visual clutter of a work surface consisting of overlapping windows. Additionally, a group of tabbed windows can be persisted together, so that the group of windows can be closed and re-opened at a later time. Top level windows are those which are not contained in any other windows. On Windows XP, these are the windows that appear in the Taskbar at the bottom of the screen. Tabbed top-level windows are a group of windows that share a common border, resize handles, system menu, and other window management UI elements. Any top-level window can be added to or later removed from the group.

It should be understood by those skilled in the art that target region 221a may be a type of visual and/or audio indicator that prompts the user as to the location for combining the windows. In accordance with at least one aspect of the present invention with reference to FIG. 2B, the association and combination of the windows may be performed by dragging and dropping window 203 into a target region 221b and then dragging and dropping window 205 into the target region 221b. In still another embodiment, a user can perform a single and/or sequence of key/button strokes to combine two windows 203 and 205. For example, a user can press a predefined sequence of key strokes on a keyboard to combine windows 203 and 205. Upon activation of the key strokes, window 203 may be combined with window 205. In another embodiment of the present invention, a user can click and drag taskbar button 213 and drag it to taskbar button 215 in order to initiate the process for combining window 203 and window 205. In still another embodiment, a user can click and actuation button on an input device, such as an electronic mouse, to combine taskbar buttons 213 and 215. It should be understood that the present invention is not so limited to the examples included herein.

As described, FIG. 3 illustrates an example of a combined window 300 being displayed in accordance with at least one aspect of the present invention. Windows 203 and 205 have been combined into a common window or tabbed window 300. The content 303 of window 203 is shown on the top of the combined window 300. A user may switch to see the content of window 205 by selecting the tab 345 along a top edge of the common window 300. As shown, because the content of window 205 is not active, e.g., behind the content 303 of window 203, the tab 345 corresponding to window 205 is shaded. Such a shading scheme may be used to notify a user as to which of the tabbed windows currently is being shown in the common window 300. The content 303 of window 203 is currently being shown in the combined window 300 and the tab 343 corresponding to window 203 is not shaded. Again, such a shading scheme may be used to notify a user as to which of the tabbed windows currently is being shown in the common window 300. Other schemes besides shading, such as size, placement of lines, font changes, and other visual cues may be used also.

Also shown in FIG. 3 is an example of how taskbar buttons 213 and 215 in the taskbar area 210 corresponding to windows 203 and 205 may be combined into a common taskbar button 317. As shown, the taskbar 210 at the bottom indicates that the content of window 203 is currently active. Because the content 303 of window 203 is active, the file name of the content of window 203 is shown along the title bar area 210. The title of window 203 is shown in taskbar button 317 as "New York Times". If a user selects to activate the content of window 205 in the common window 300, taskbar button 317 would change to have the title read as the title of window 205, "Wired News". Next to taskbar button 317 is shown a menu activation switch 331. Menu activation switch 331 allows a user to see and/or switch to any other non active windows that are combined with the active window. Upon activation of menu activation switch 331, a dropdown menu of all other windows combined in the common window may be displayed for a user to switch to, i.e., to make active in the common window. As such, a user can see and/or switch to other windows in the combined window 300 by using the tabs 243 and 245 and/or using the menu activation switch 331. Other implementations may be used also, such as keyboard shortcuts or menus accessible from other places in the user interface, such as a system menu for common window 300.

As described below, a change to the orientation of the common window 300 may automatically initiate a change to the orientation of the underlying window 203 and 205. Common window 300 is shown to include three mode selection buttons 351, 353, and 355.

Mode selection button 351 may be an operation to minimize common window 300. Mode selection button 353 may be an operation to restore common window 300. Mode selection button 355 may be an operation to close window 300.

Upon activation of a mode selection button, such as mode selection button 351, common window 300 has an operation performed on it. In this case, a user may select to minimize common window 300 upon depression of mode selection button 351. In response, the operating system automatically may perform the same operation on underlying windows 203 and 205 as the two windows, 203 and 205, are associated with each other. Although mode selection interfaces, buttons and common borders are described in these examples, it should be understood by those skilled in the art that other types of operations and/or orientation changes may be performed on the windows and that the present invention is not so limited to the examples herein. For example, a user may choose to perform an operation from a drop down menu for common window 300, such as to save the content 303. In such a case, the system automatically may save the content corresponding to window 205 as well. In other embodiments, the system may be configured to allow for certain operations to be performed automatically, such as maximizing and minimizing the common window, while not performing other operations automatically. For example, saving the content of common window 300 may automatically save the content of both the active window shown and other tabbed windows in the common window 300, while disassociating one window from the common window 300 may not disassociate all other windows.

User interface elements, such as the mode selection buttons, allow users to create, modify, save, and restore the windows of the tabbed window group together. This includes the ability to drag a window and drop it on a target on the title bar of another window to tab them together, as well as a more traditional menu-driven approach. Windows in a group no longer have to have their own sizing, minimizing, maximizing, hiding, showing, docking, and other window manipulation action operations. Instead, the windows may rely on the common window to provide those user interface elements. Additionally, the common group may allow for saving and closing the common window.

Figure 4:
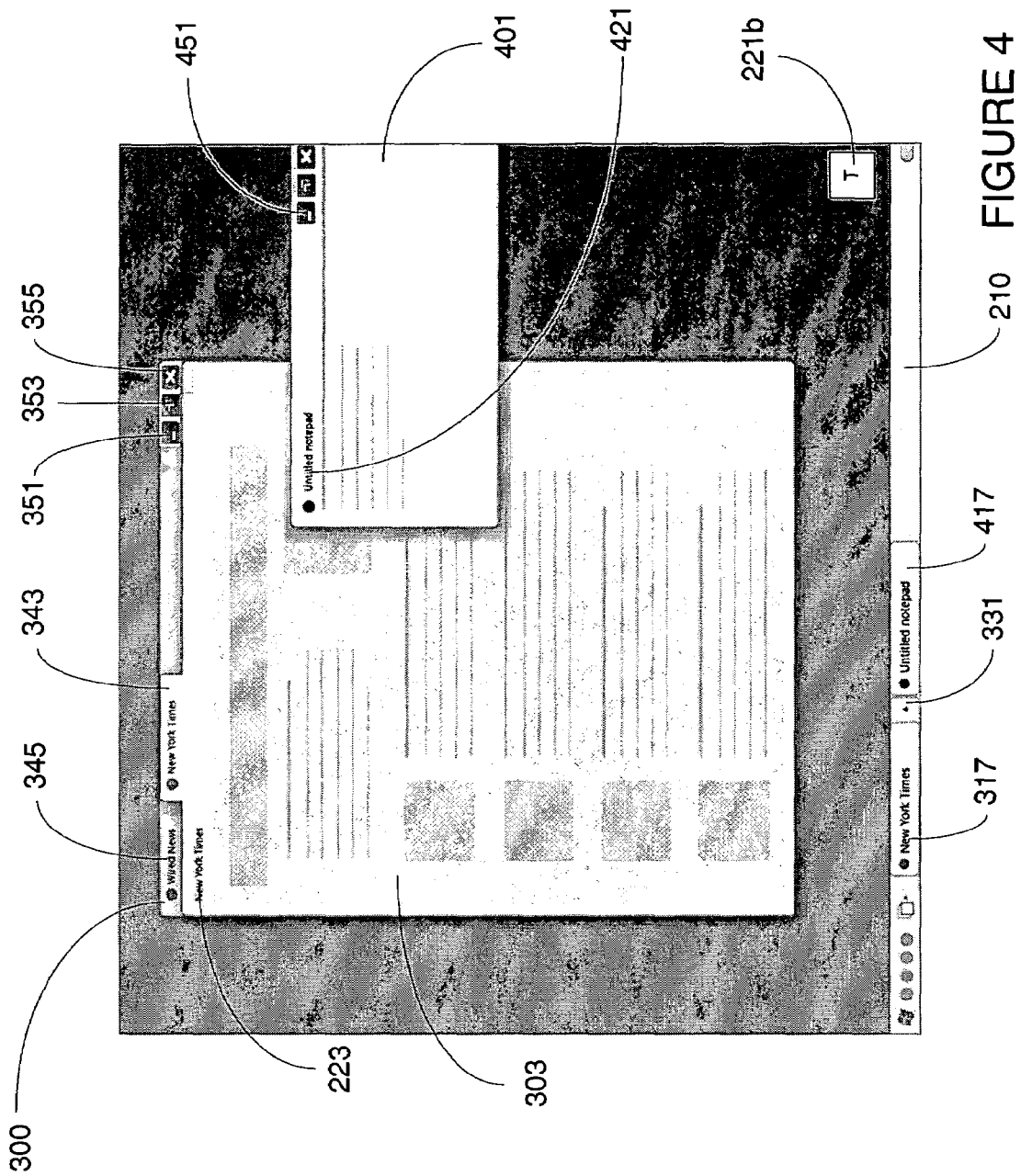
FIG. 4 illustrates an example of a combined window being associated with another window in accordance with at least one aspect of the present invention.

As shown in FIG. 4, a user has begun to move a newly opened window 401, by dragging its title bar with a mouse pointer, such as mouse pointer 231 in FIG. 2B. In this example, target region 221b may be a predefined location point on the display where two windows can be dragged and dropped to be combined with each other. The predefined location of the target region 221b may appear when a window and/or mouse pointer is/are close to it or it may always be present in a predefined location. Window 401 is shown with a title 421 in the title bar region of the window. Window 401 also is shown with corresponding mode selection buttons, such as button 451. Once again, window 401 is used by an application program to display content to a user. The application program associated with window 401 may be a different application program or the same application program corresponding to either or both of windows 203 and 205. Window 401 is independent of and external to common window 300. An taskbar button 417 corresponding to window 401 is shown in the taskbar area 210.

Figure 5:
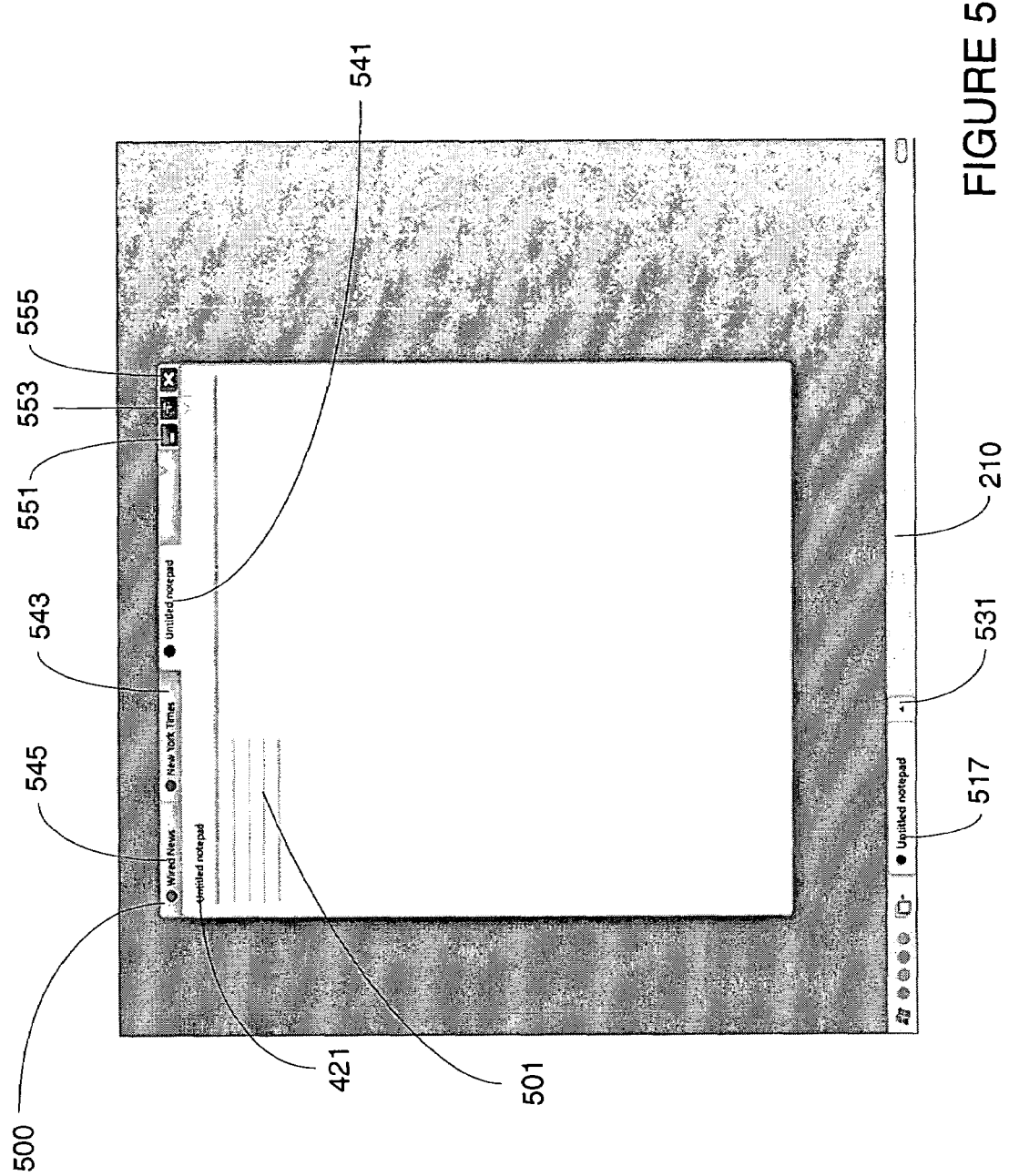
FIG. 5 illustrates an example of a combined window being displayed in accordance with at least one aspect of the present invention.

FIG. 5 illustrates an example of a combined window 500 being displayed in accordance with at least one aspect of the present invention. Common window 303 has been combined with window 401 into a common window or tabbed window 500. The content 501 of window 401 is shown on the top of the combined window 500. A user may switch to see the content of window 203 or window 205 by selecting the tab 543 or tab 545 along a top edge of the common window 500. As shown, because the content of windows 203 and 205 is not active, e.g., behind the content 501 of window 401, the tabs 543 and 545 corresponding to windows 203 and 205 are shaded. Such a shading scheme may be used to notify a user as to which of the tabbed windows currently is being shown in the common window 500. The content 501 of window 401 is currently being shown in the combined window 500 and the tab 541 corresponding to window 401 is not shaded. Again, such a shading scheme may be used to notify a user as to which of the tabbed windows currently is being shown in the common window 500. Other implementations may be used also, such as keyboard shortcuts or menus accessible from other places in the user interface, such as a system menu for common window 300.

Also FIG. 5 shows an example of how taskbar buttons 517 and 417 in the taskbar area 210 corresponding to common window 500 and window 401 may be combined into a common taskbar button 517. As shown, the taskbar 210 at the bottom indicates that the content of window 401 is currently active. Because the content 501 of window 401 is active, the file name of the content of window 401 is shown along the title bar area 210. The title of window 401 is shown in taskbar button 517 as "Untitled notepad". If a user selects to activate the content of window 203 or 205 in the common window 500, taskbar button 517 would change to have the title read as the title of window 203, "New York Times", or the title of window 205, "Wired News". Next to taskbar button 517 is shown a menu activation switch 531. Menu activation switch 531 allows a user to see and/or switch to any other non active windows that are combined with the active window. Upon activation of menu activation switch 531, a dropdown menu of all other windows combined in the common window 500 may be displayed for a user to switch to, i.e., to make active in the common window. As such, a user can see and/or switch to other windows in the combined window 500 by using the tabs 541, 543, and 545 and/or using the menu activation switch 531. Common window 500 is shown to include three mode selection buttons 551, 553, and 555, which may function in a similar manner as mode selection buttons 351, 353, and 355 in FIG. 3.

It should be understood by those skilled in the art that two windows can be tabbed together even if the windows are not inherently resizeable when they are independent of each other. For example, a window with a fixed size could be tabbed with a window of a variable size. In accordance with at least one embodiment, two windows may be tabbed together while still maintaining their independent size, although they may maintain a shared position, such as in the Z-order, or a shared visibility. In such an embodiment, when a user selects a tab to switch to another window, the combined or common window changes size to match the size of the selected window. For example, if a window containing a document in landscape view is tabbed with a window containing a document in portrait view, the size of the common window may change between portrait and landscape as the corresponding tab is selected for a window. In still another embodiment, fixed size window also may be included in a tabbed group by causing the combined or common window to resize when it is selected or shown either clipped, scaled, or on top of some background surface when the combined or common window's size is not the same.

Figure 6:
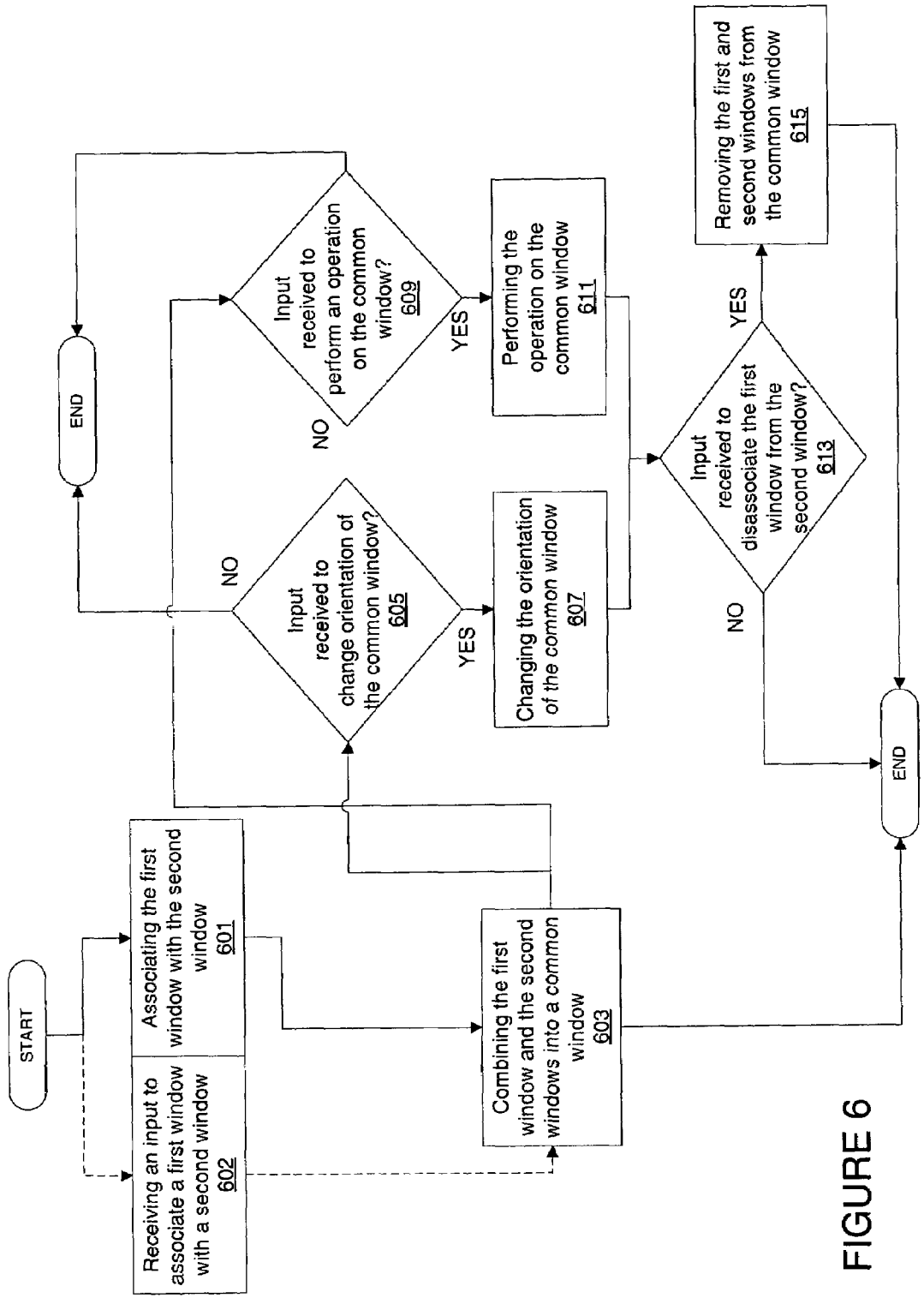
FIG. 6 is a flowchart of an illustrative example of a method for combining two windows in accordance with at least one aspect of the present invention.

FIG. 6 is a flowchart of an illustrative example of a method for combining two windows in accordance with at least one aspect of the present invention. The process starts at step 601 where a first window is associated with a second window. As part of the process of associating the two windows, an input may be received at step 602 to request an association of the first and second windows. The first and second windows independent of and external to each other. The process moves to step 603 where the first and second windows are combined into a common window on a display screen. With the two windows combined with each other, the process may end.

The process also may continue to step 605 where a determination is made as to whether an input has been received to change the orientation of the common window. For example, the input may be a request to adjust the border of the common window. If an input has not been received, the process ends. If an input has been received at step 605, the process moves to step 607 where the orientation of the common window is changed in accordance with the request. Alternatively and/or concurrently, from step 603, the process may proceed to step 609 where a determination is made as to whether an input has been received to perform an operation on the common window. One type of operation may include an operation to save the content displayed within the common window. If an input has not been received, the process ends. If an input has been received at step 609, the process moves to step 611 where the operation is performed on the common window. In such a case of saving the content, if the operation is to be performed common to both windows, the contents of both the first and the second windows are saved. Alternatively, if the operation is independent of the other non active window(s), the operation is only performed on the one window to which the operation was directed.

From either step 607 or 611, the process moves to step 613 where a determination is made as to whether an input has been received to disassociate the first and second windows. For example, a user may decide that she no longer desires to have the first and second window tabbed together. If an input has not been received, the process ends. If an input has been received at step 613, the process moves to step 615 where the first and second windows are removed from the common window and the process ends.

Figure 7:
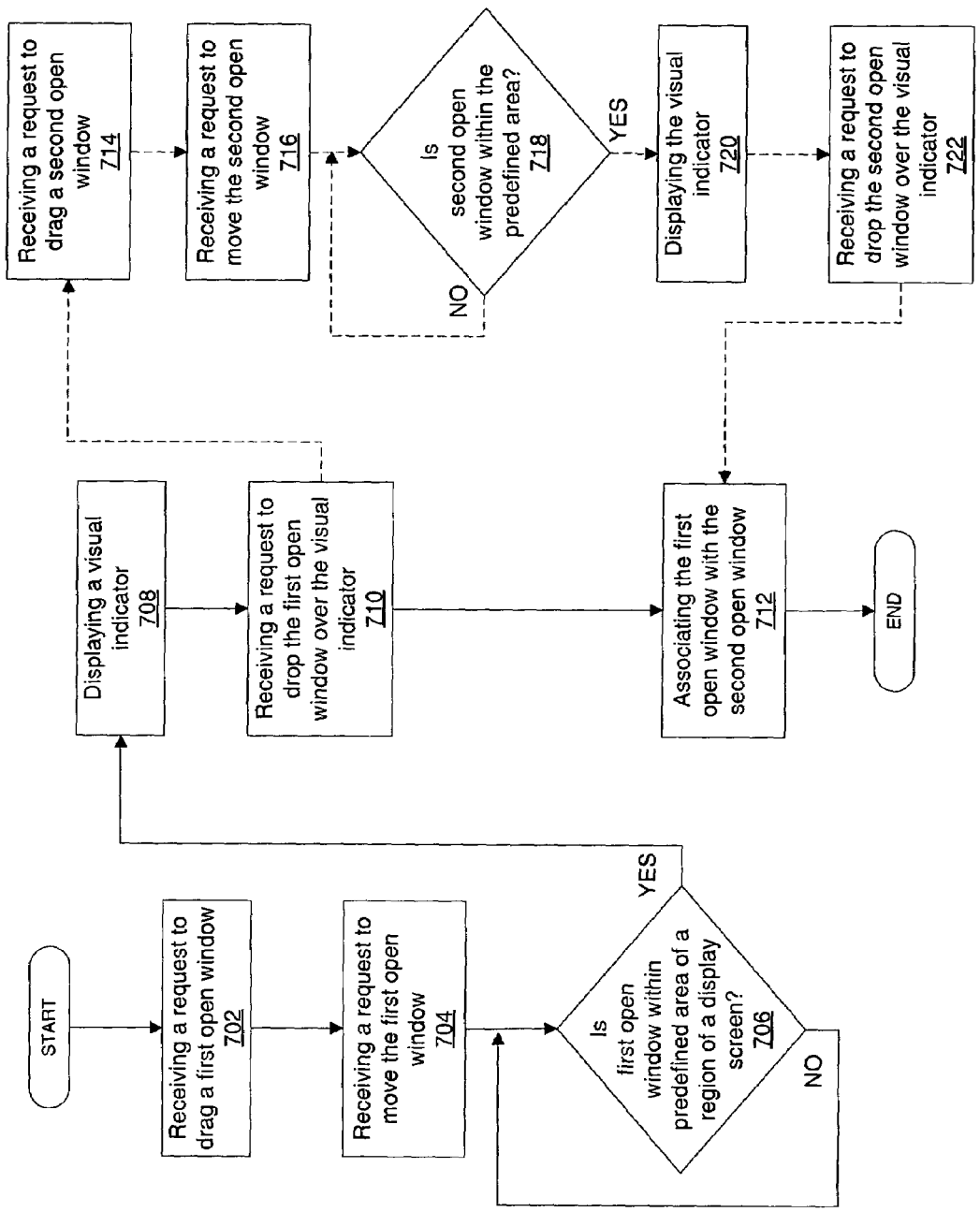
FIG. 7 is a flowchart of an illustrative example of a method for combining two windows using a visual indicator in accordance with at least one aspect of the present invention.

FIG. 7 is a flowchart of an illustrative example of a method for combining two windows using a visual indicator in accordance with at least one aspect of the present invention. The process starts at step 702 where a request to drag a first open window is received by the system. Such a request may originate in the form of a click and hold of an electronic input device by a user. At step 704, a request to move the first open window is received by the system. Such as request may originate in the form of a movement of an electronic input device, such as an electronic mouse. The process then moves to step 706.

At step 706, a determination is made as to whether the first open window is within a predefined area of a region of a display screen. For example, the predetermined region may be within an inch of the target region and the system may determine that the user has dragged the first open window within an inch of the target region. In another example, the predetermined region may be a fixed target location on a display and the system may determine that the user has dragged the first open window over the fixed target location. If the first open window is not within the predefined area, the process returns back to step 706. If the first open window is within the predefined area, the process moves to step 708 where a visual indicator is displayed. It should be noted that an audio indicator may also be used, or alternatively, be used in place of the visual indicator.

At step 710, a request to drop the first window over the visual indicator is received. Such a request may originate in the form of a user releasing a clicked and held electronic input device button from step 702. From step 710, the process may proceed to step 712 where the first open window and a second open window are associated with each other. Alternatively, from step 710, the process may move to step 714 where a request to drag the second open window is received by the system. At step 716, a request to move the second open window is received by the system. Such a request may originate in the form of a movement of an electronic input device, such as an electronic mouse. The process then moves to step 718.

At step 718, a determination is made as to whether the second open window is within a predefined area of a region of a display screen. If not, the process returns back to step 718. If the second open window is within a predefined area, the process moves to step 720 where a visual indicator is displayed. At step 722, a request to drop the second window over the visual indicator is received. Such a request may originate in the form of a user releasing a clicked and held electronic input device button from step 714. From step 722, the process may proceed to step 712 where the fist open window and the second open window are associated with each other.

Figure 8:
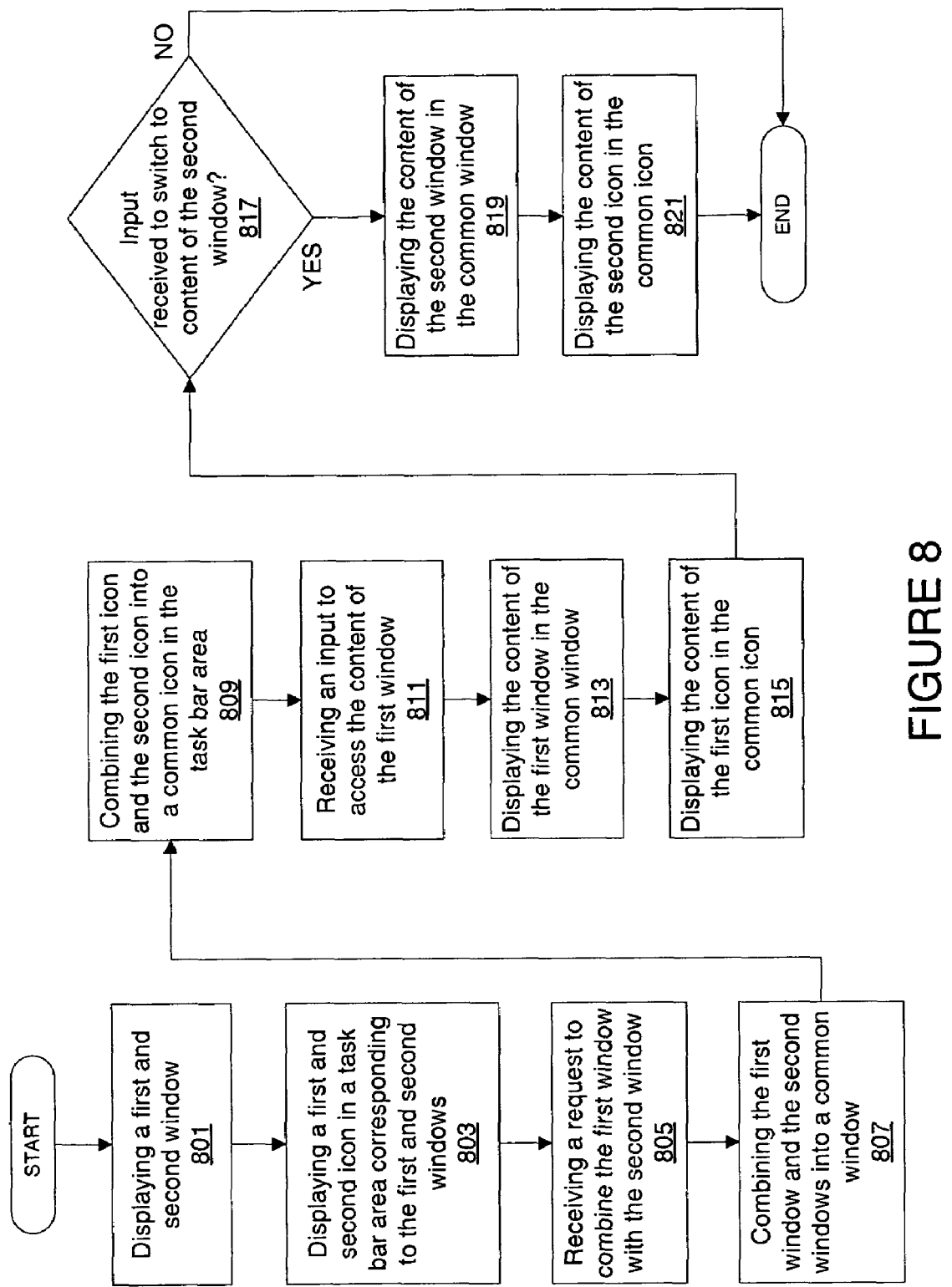
FIG. 8 is a flowchart of an illustrative example of a method for combining and switching between the content of two windows and taskbar buttons in a taskbar area in accordance with at least one aspect of the present invention.

FIG. 8 is a flowchart of an illustrative example of a method for combining and switching between the content of two windows and taskbar buttons in a taskbar area in accordance with at least one aspect of the present invention. The process starts at step 801 where a first and a second window are displayed on a display screen. Once again, the first and second window may operate under the same or different operating programs. The first and second windows are independent of and external to each other. At step 803, first and second taskbar buttons are displayed within a taskbar area of the display screen. The first and second taskbar buttons correspond to the first and second open windows respectively. The process moves to step 805 where a request is received to combine the first window and the second window into a common window. In such a case, a user may drag and drop the first window into the second window. At step 807, the first and second windows are combined into the common window.

At step 809, the first taskbar button and the second taskbar button, corresponding to the first and second windows, are combined into a common taskbar button in the taskbar area. Moving to step 811, an input is received to access, e.g., display, the content of the first window. At step 813, the content of the first window is displayed in the common window. Then, at step 815, the content of the first taskbar button is displayed in the common taskbar button. For example, when the user selects the tab corresponding to the first window, the common taskbar button in the taskbar area may change to reflect the title of the first window.

At step 817, a determination is made as to whether an input has been received to switch to the content of the second window. An input may correspond to a user selecting the tab corresponding to the second window. If no, the process ends. If an input is received, at step 819, the content of the second window is displayed in the common window. Then, at step 821, the content of the second taskbar button is displayed in the common taskbar button and the process ends. For example, when the user selects the tab corresponding to the second window, the common taskbar button in the taskbar area may change to reflect the title of the second window.

Another embodiment is programmatically controlling the opening of windows directly into a common window. For example, one or more applications, such as Microsoft Office, may share the concept of a project consisting of several documents. These documents may be opened simultaneously into a combined window or automatically added to a combined window as new documents in the project are opened by a user.

With respect to an application programming interface (API), various aspects of the present invention may be performed by an API. For example, public APIs may interface with an operating system to allow an operating system to provide the various features of the present invention. In one embodiment, a software architecture for processing data representative of combined windows may include a component configured to combine a first open window and a second open window into a common open window and an application program interface to access the component. An API may receive a request to group two windows into a common window, access the necessary function(s) to perform the operation, and then send the results back to an operating system. The operating system may use the data provided from the API to perform the various features of the present invention.

APIs that let application programs take advantage of window groups includes grouping and un-grouping windows programmatically, as well as letting application programs specify how the states of the windows are handled when a command is implemented on a common window, such as save, print, zoom content, compare versions, compile source code, etc. This state information allows a window of an application program in a common window to restore to an appropriate, instead of a default, state when a common window is opened. For example, instead of just opening a blank document, an editing application program may reopen the document that was open when the common window was saved.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for combining a plurality of windows on a display screen, the method comprising steps of:
   receiving an input to associate a first window of a first size and at least one second window of a second size, wherein the input is a signal corresponding to a movement of the at least one second window over a target location of the first window;
   associating the first window with the at least one second window, said at least one second window being independent of and external to the first window, and the first size being different from the second size;
   combining the first window and the at least one second window into a common window on a display screen, the first window and the at least one second window being configured to share a common window frame;
   allowing each of the first window and the at least one second window to be selected from the common window frame;
   sizing the common window frame to the first size when content of the first window is selected; and
   sizing the common window frame to the second size when content of the second window is selected.

2. The method of claim 1, further comprising a step of performing an operation on the common window.

3. The method of claim 2, wherein the step of performing includes changing an orientation of the common window based upon an activation of a mode selection interface.

4. The method of claim 1, wherein the target location is an object that appears on the first window when the at least one second window is dragged within a predefined area of the first window.

5. The method of claim 1, wherein an operation performed on the common window automatically performs the operation on the first window and the at least one second window.

6. The method of claim 1, wherein the common window frame includes a first tab to access the first window and a second tab to access the at least one second window.

7. The method of claim 6, wherein the second tab is partially obscured when the first window is an active window.

8. The method of claim 1, wherein the first window corresponds to a first application program and the second window corresponds to a second application program.

9. The method of claim 8, wherein the first application program and the second application program are different application programs.

10. The method of claim 1, further comprising steps of:
    receiving an input corresponding to a request to disassociate the first window and the at least one second window; and
    removing the first window and the at least one second window from the common window.

11. The method of claim 1, further comprising a step of combining a first taskbar button in a taskbar area corresponding to the first window and a second taskbar button in the taskbar area corresponding to the at least one second window into a common taskbar button in the taskbar area.

12. The method of claim 11, wherein the common taskbar button corresponds to the first taskbar button when the first window is active and the common taskbar button corresponds to the second window when the at least one second window is active.

13. A computer readable storage medium having a series of computer-executable instructions for performing a method of combining a plurality of windows on a display screen, the method comprising:

sending an instruction to combine a first top level window corresponding to a first application program and an at least one second top level window corresponding to a second application program into a common window, wherein the combination of the first top level window and the at least one second top level window is responsive to the first top level window and the at least one second top level window having been dragged into a predetermined target region displayed on the display screen.

14. The computer readable storage medium of claim 13, wherein the method further comprises sending an instruction to modify the common window.

15. The computer readable storage medium of claim 13, wherein the first application program and the second application program are the same application program.

16. The computer readable storage medium of claim 13, wherein the common window is configured to be modified by the first application program.

17. The computer readable storage medium of claim 13, wherein the first application program and the second application program are different application programs.

18. A computer readable storage medium having a series of computer-executable instructions for performing a method for combining a plurality of windows on a display screen, the method comprising steps of:

receiving an input to associate a first window and at least one second window, wherein the input is a signal corresponding to a movement of the at least one second window over a target location of the first window;

associating the first window with the at least one second window, said at least one second window being independent of and external to the first window, and the first size being different from the second size;

combining the first window and the at least one second window into a common window on a display screen, the first window and the at least one second window being configured to share a common window frame;

allowing each of the first window and the at least one second window to be selected from the common window frame;

sizing the common window frame to the first size when content of the first window is selected; and sizing the common window frame to the second size when content of the second window is selected.

19. The method of claim 18, wherein the first window corresponds to a first application program and the second window corresponds to a second application program.

20. The method of claim 19, wherein the first application program and the second application program are different application programs.

* * * * *